Patented Sept. 15, 1942

2,295,563

UNITED STATES PATENT OFFICE 2,295,563

DIAZINE DERIVATIVES

Gaetano F. D'Alelio and James W. Underwood, Pittsfield, Mass., assignors to General Electric Company, a corporation of New York No Drawing. Application July 30, 1941,
Serial No. 404,663

14 Claims. (Cl. 260—251)

This invention relates to new chemical compounds and more particularly to diazine derivatives. The invention especially is concerned with the production of new and useful ureido and thioureido diazines.

The diazine derivatives of this invention may be represented graphically by the following general formula:

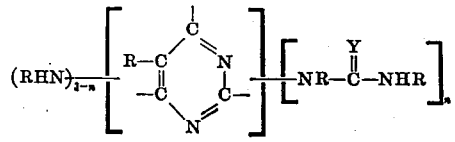

In the above formula $n$ represents an integer and is at least 1 and not more than 3, Y represents a member of the class consisting of oxygen and sulfur, and R represents a member of the class consisting of hydrogen and monovalent hydrocarbon and halo-hydrocarbon radicals, numerous examples of which hereafter are given. From a consideration of the formula it further will be seen that when $n$ is 3 there will be no amino (—NHR) groups attached to the diazine nucleus.

Illustrative examples of monovalent radicals that R in the above formula may represent are aliphatic (e. g., methyl, ethyl, propyl, isopropyl, allyl, butyl, secondary butyl, isobutyl, butenyl, amyl, isoamyl, hexyl, etc., including cycloaliphatic (e. g., cyclopentyl, cyclopentenyl, cyclohexyl, cyclohexenyl, cycloheptyl, etc.); aryl (e. g., phenyl, diphenyl, naphthyl, etc.); alkaryl (e. g., tolyl, xylyl, ethylphenyl, propylphenyl, isopropylphenyl, etc.); aralkyl (e. g., benzyl, phenylethyl, phenylpropyl, etc.); and their homologues, as well as those groups with one or more of their hydrogen atoms substituted by, for example, a halogen. Specific examples of halogeno-substituted hydrocarbon radicals are chlorphenyl, chlorcyclohexyl, chlormethyl, dichlorphenyl, ethyl chlorphenyl, phenyl chlorethyl, bromethyl, bromtolyl, etc. Preferably R is hydrogen.

The new diazine derivatives of this invention may be used as intermediates in the preparation of derivatives thereof such as carbamic esters, salts of carbamic acid, etc., of the individual ureido or thioureido diazine. The chemical compounds of this invention are especially valuable in the preparation of synthetic resinous compositions since they combine in one compound the advantages of the diazines and ureas. Thus, they may be condensed with, for instance, aldehydes, including polymeric aldehydes and aldehyde-addition products, to yield condensation products of particular utility in the plastics and coating arts. Such condensation products are more fully described and are specifically claimed in our copending application Serial No. 404,662, filed concurrently herewith and assigned to the same assignee as the present invention.

Various methods may be employed to produce the chemical compounds of this invention. One suitable method comprises effecting reaction between a halogenated 1,3-diazine (that is, a meta-diazine having a halogen atom attached directly to a carbon atom of the diazine nucleus) and an alkali-metal derivative, advantageously the sodium derivative, of a urea or thiourea corresponding to the ureido or thioureido substituent to be introduced into the diazine nucleus. This reaction may be represented by the following general equation:

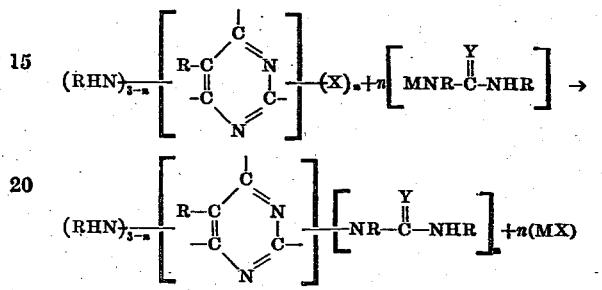

In the above equation X represents halogen, M represents an alkali metal (sodium, potassium, lithium, rubidium, caesium) and $n$, R and Y have the same meanings as given above with reference to the general formula I for the diazine derivatives of this invention. This reaction is carried out in an anhydrous liquid medium, for example in ether, benzene, etc.

It will be understood, of course, by those skilled in the art that the choice of the starting reactants and the mol ratios thereof depend upon the particular end-products desired. Illustrative examples of halogenated 1,3-diazines that may be used, depending upon the particular product sought, are listed below:

2-chloro 4,6-diamino 1,3-diazine
2-bromo 4,6-diamino 1,3-diazine
2,4-dichloro 6-amino 1,3-diazine
2,4-dibromo 6-amino 1,3-diazine
2,4,6-trichloro 1,3-diazine
2,4,6-tribromo 1,3-diazine
2-chloro 5-ethyl 4,6-diamino 1,3-diazine
2,4-dichloro 5-phenyl 6-amino 1,3-diazine
2,4,6-trichloro 5-methyl 1,3-diazine
2-chloro 4,6-di-(ethylamino) 1,3-diazine
2,4-dichloro 5-phenyl 6-phenylamino 1,3-diazine
2-chloro 4-ethylamino 6-amino 1,3-diazine
2-chloro 4-ethylamino 5-ethyl 6-phenylamino 1,3-diazine
2-bromo 5-cyclohexyl 4,6-diamino 1,3-diazine
2-chloro 5-chlorphenyl 4,6-diamino 1,3-diazine
2-chloro 4,6-di-(chlorphenylamino) 1,3-diazine Illustrative examples of alkali-metal ureas and thioureas that may be employed, the choice depending upon the particular ureido or thioureido substituent to be introduced into the diazine nucleus, are the alkali-metal derivatives, e. g., the sodium and potassium derivatives, of the following ureas and thioureas:

> Urea
> Thiourea
> Methyl urea
> Ethyl urea
> Allyl urea
> Phenyl urea
> Chlorphenyl urea
> Methyl thiourea
> Ethyl thiourea
> Phenyl thiourea
> N,N'-diethyl urea
> N,N'-diphenyl urea
> N-ethyl N'-phenyl urea
> N-ethyl N'-cyclohexyl urea
> Chlorethyl urea
> 2-chlorallyl urea
> Chlorethyl thiourea
> Chlorphenyl thiourea In order that those skilled in the art better may understand how the present invention may be carried into effect, the following illustrative examples thereof are given:

EXAMPLE 1

*Preparation of 2-ureido 4,6-diamino 1,3-diazine*

Equal molecular proportions of 2-chloro 4,6-diamino 1,3-diazine and sodium urea in ether, benzene or other suitable anhydrous liquid medium are stirred together for from 15 to 24 hours at or below room temperature. The reaction product (2-ureido 4,6-diamino 1,3-diazine) is filtered off, washed free of sodium chloride and dried. The following equation represents the reaction:

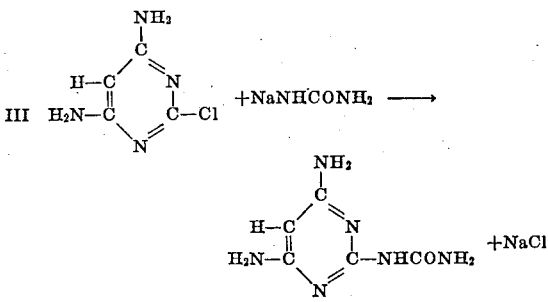

EXAMPLE 2

*Preparation of 2,4,6-triureido 1,3-diazine*

The same procedure is followed as described under Example 1 with the exception that the halogenated diazine is 2,4,6-trichloro 1,3-diazine and the sodium urea is employed in an amount corresponding to 3 mols sodium urea per mol of the said halogenated diazine. The reaction may be represented by the following equation:

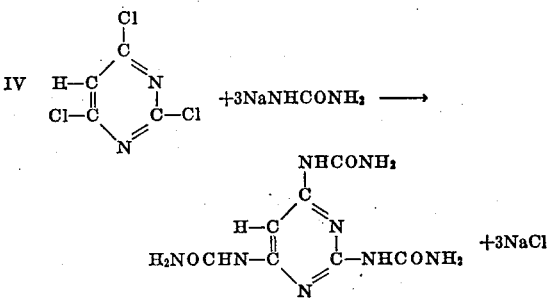

The new chemical compounds of this invention, all of which contain at least one amino (—NHR) group and at least one ureido (—NRCONHR) or thioureido (—NRCSNHR) group attached to a diazine nucleus, also may be prepared by causing a polyhalogenated 1,3-diazine to react with an alkali-metal urea or thiourea in an amount insufficient to react with all of the halogen atoms of the halogenated diazine. The resulting product then is reacted with ammonia or with an amine to yield various ureido (or thioureido) amino 1,3-diazines.

When it is desired to produce only the mono-ureido or mono-thioureido diazine derivatives then still another method may be employed. Specifically the amino derivatives of the 1,3-diazines are caused to react with the cyanates, thiocyanates, isocyanates or isothiocyanates to yield the corresponding monoureido- or monothioureido-substituted products. For example, a polyamino 1,3-diazine is caused to react in aqueous solution under carefully controlled temperature conditions with a cyanate, thiocyanate, isocyanate or isothiocyanate, the reaction proceeding as represented by the following general equation:

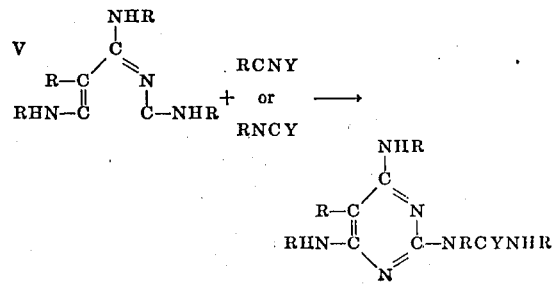

In the above equation R and Y have the same meanings as above given with reference to Formula I for the diazine derivatives of this invention.

When R in the formulas RCNY and RNCY represents hydrogen, the acids corresponding to the formulas HCNY and HNCY may be formed in situ by using an alkali-metal salt, an alkaline-earth salt or an ammonium salt of cyanic, isocyanic, thiocyanic or isothiocyanic acid and by carrying out the reaction in the presence of an organic or inorganic acid that is stronger than the salt of the normal or iso-cyanate (or iso-thiocyanate) employed, e. g., hydrochloric, hydrobromic, sulfuric, chloracetic, etc., acids. Alternatively, we may use a starting reactant a preformed, acid mono salt of the polyamino diazine, the acid used in the preparation of such salt likewise being stronger than the salt of the normal or iso-cyanate (or iso-thiocyanate) employed, e. g., a monohydrochloride, monohydrobromide, etc. of the polyamino diazine. Sodium, potassium, calcium and magnesium cyanates, isocyanates, thiocyanates and isothiocyanates are more specific examples of salts that may be used in carrying out the reaction with the polyamino diazine or acid salt thereof. More specific examples of normal and isocyanates that may be employed when R in the formulas RCNY and RNCY is other than hydrogen are the methyl, ethyl, propyl, isopropyl, butyl, amyl, allyl, phenyl, chlorphenyl, etc., cyanates, isocyanates, thiocyanates and isothiocyanates. More specific examples of aminodiazines that may be used in preparing mono-ureido diamino diazines or mono-thioureido diamino diazines by the above-described method are: 2-amino 4,6-di-(ethylamino) 1,3-diazine; 2-ethylamino 4,6-(phenylamino) 1,3-diazine; 2,4,6-tri-(methylamino) 1,3-diazine; 2,4,6-tri-(ethylamino) 1,3-diazine; 2-amino 4-ethylamino 5-ethyl 6-phenylamino 1,3-diazine; 2-amino 4-methylamino 6-ethylamino 1,3-diazine; 2,4,6-tri-(propylamino) 5-methyl 1,3-diazine; etc.

It was quite surprising and unexpected to find that mono-ureido and mono-thioureido diazines could be produced by the above method, since heretofore the production of other substituted ureido compounds from cyanates and isocyanates has been considered possible only when using strongly basic amino compounds as reactants, e. g., aniline, ethylene diamine, etc. In contrast with such strongly basic amino compounds the aminodiazines are practically neutral substances.

The following example illustrates the production of 2-ureido 4,6-diamino 1,3-diazine by the above-described method. All parts are by weight.

EXAMPLE 3

Sixty-four parts 2,4,6-triamino 1,3-diazine mono-hydrochloride were dissolved in 2,000 parts distilled water, after which the solution was cooled to 0° C. To the cooled solution was added 50 parts potassium cyanate in 200 parts water. The reaction mixture was kept at a low temperature for several hours. Finally the mass was heated on a water bath for two hours. The reaction product comprising 2-ureido 4,6-diamino, 1,3-diazine was filtered off, washed free of potassium chloride and dried. A crystalline product that sublimed with charring above 280° C. was obtained.

From the foregoing description it will be seen that the present invention provides new and useful ureido and thioureido diazines, examples of which are the tri-ureido 1,3-diazines, the tri-(thioureido) 1,3-diazines, the monoamino (—NHR) diureido 1,3-diazines, the monoamino (—NHR) di-(thioureido) 1,3-diazines, the diamino [(—NHR)₂] monoureido 1,3-diazines and the diamino [(—NHR)₂] mono-(thioureido) 1,3-diazines. Other and more specific examples of these new compounds are shown below:

VI

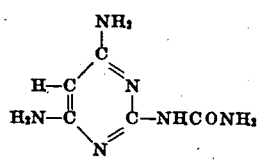

2-ureido 4, 6-diamino 1, 3-diazine

VII

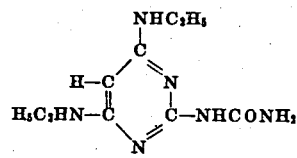

2-ureido 4, 6-di-(ethylamino) 1, 3-diazine

VIII

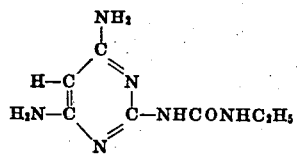

2-(ethyl ureido) 4, 6-diamino 1, 3-diazine

IX

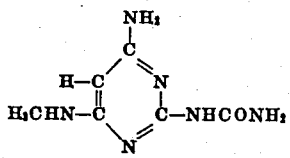

2-ureido 4-methylamino 6-amino 1, 3-diazine

X

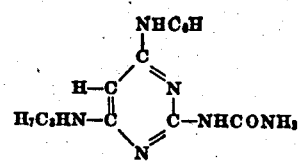

2-ureido 4-propylamino 6-phenylamino 1,3-diazine

XI

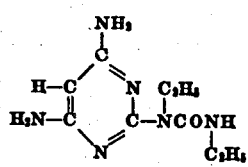

2-(N,N'-diethyl ureido) 4,6-diamino 1,3-diazine

XII

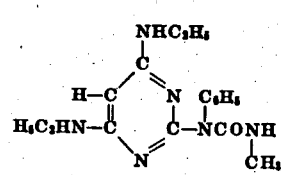

2-(N-phenyl N'-methyl ureido) 4,6-di-(ethylamino) 1,3-diazine

XIII

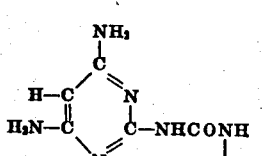

2-(beta-chlorethyl ureido) 4,6-diamino 1,3-diazine

XIV

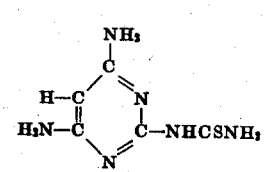

2-thioureido 4,6-diamino 1,3-diazine

XV

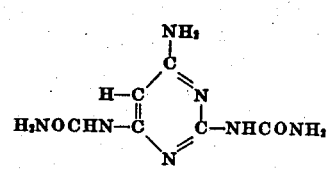

2,4-diureido 6-amino 1,3-diazine

XVI

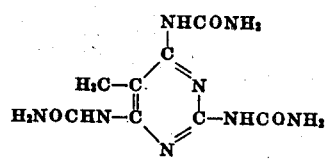

2,4,6-triureido 5-methyl 1,3-diazine

XVII

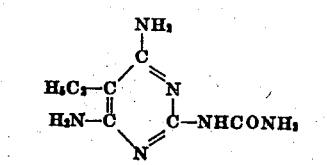

2-ureido 5-ethyl 4,6-diamino 1,3-diazine

XVIII

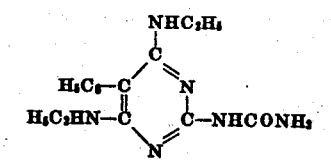

2-ureido 5-phenyl 4,6-di-(ethylamino) 1,3-diazine

XIX 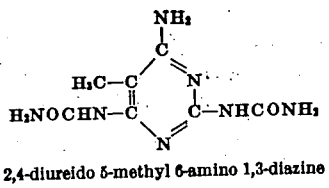

2,4-diureido 5-methyl 6-amino 1,3-diazine

XX 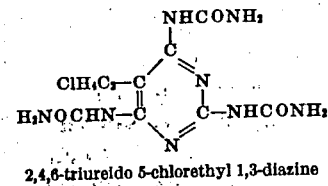

2,4,6-triureido 5-chlorethyl 1,3-diazine

Other examples are listed below without their formulas, since their formulas will be readily apparent to those skilled in the art from the formulas for the above-mentioned compounds:

2-(ethyl thioureido) 4,6-di-(phenylamino) 1,3-diazine
2-thioureido 4,6-(ethylamino) 1,3-diazine
2-(N-ethyl N'-phenyl thioureido) 4,6-diamino 1,3-diazine
2-(N,N'-diethyl thioureido) 4,6-diamino 1,3-diazine
2-thioureido 4-ethylamino 6-phenylamino 1,3-diazine
2-ureido 4,6-di-(methylamino) 1,3-diazine
2-ureido 4,6-di-(cyclohexylamino) 1,3-diazine
2-ureido 4,6-di-(chlorphenylamino) 1,3-diazine
2-ureido 4,6-di-(chlorethylamino) 1,3-diazine
2-ureido 5-methyl 4,6-di-(ethylamino) 1,3-diazine
2,4-di-(thioureido) 6-amino 1,3-diazine
2,4,6-tri-(thioureido) 1,3-diazine
2-ureido 4-thioureido 6-amino 1,3-diazine
2-thioureido 5-ethyl 4,6-di-(ethylamino) 1,3-diazine
2,4-di-(thioureido) 5-methyl 6-amino 1,3-diazine
2,4,6-tri-(thioureido) 5-chlorethyl 1,3-diazine In a manner similar to that described above with particular reference to the production of ureido and thioureido 1,3- or meta-diazines (ureido and thioureido pyrimidines), the corresponding ureido and thioureido 1,2- or ortho-diazines (ureido and thioureido pyridazines) and the ureido and thioureido 1,4- or para-diazines (ureido and thioureido pyrazines) may be prepared.

What we claim as new and desire to secure by Letters Patent of the United States is:

1. Chemical compounds corresponding to the general formula

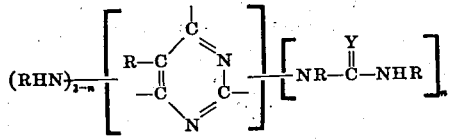

where $n$ is an integer and is at least 1 and not more than 3, R is a member of the class consisting of hydrogen and monovalent hydrocarbon and halo-hydrocarbon radicals, and Y is a member of the class consisting of oxygen and sulfur.

2. Chemical compounds as in claim 1 wherein R represents hydrogen.

3. Chemical compounds as in claim 1 wherein Y represents oxygen.

4. Chemical compounds as in claim 1 wherein R represents hydrogen and Y represents oxygen.

5. Chemical compounds as in claim 1 wherein R represents hydrogen and $n$ is 1.

6. 2,4,6-triureido 1,3-diazine.

7. 2-ureido 4,6-diamino 1,3-diazine.

8. 2-thioureido 4,6-diamino 1,3-diazine.

9. The method of preparing chemical compounds corresponding to the general formula

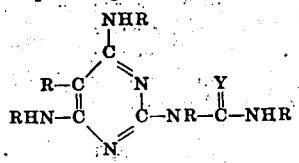

where Y represents a member of the class consisting of oxygen and sulfur and R represents a member of the class consisting of hydrogen and monovalent hydrocarbon and halo-hydrocarbon radicals, said method comprising effecting reaction between (1) a compound corresponding to the general formula

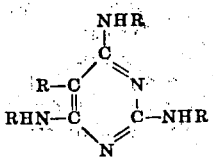

where R has the meaning above given, and (2) a compound selected from the class of compounds corresponding to the general formulas RCNY and RNCY where R and Y have the meanings above given.

10. A method as in claim 9 wherein R represents hydrogen and the reactant of the class consisting of HCNY and HNCY is formed in situ by using a suitable member of the class consisting of the alkali-metal salts, the alkaline-earth salts and the ammonium salts of cyanic, isocyanic, thiocyanic and isothiocyanic acids and by carrying out the reaction in the presence of an inorganic acid.

11. A method as in claim 9 wherein R represents hydrogen and the reactant of the class consisting of HCNY and HNCY is formed in situ by using a suitable member of the class consisting of the alkali-metal salts, the alkaline-earth salts and the ammonium salts of cyanic, isocyanic, thiocyanic and isothiocyanic acids and by using an inorganic acid mono salt of the tri-amino diazine as a starting reactant.

12. The method of preparing 2-ureido 4,6-diamino 1,3-diazine which comprises effecting reaction between an inorganic acid mono salt of 2,4,6-triamino 1,3-diazine and an alkali-metal cyanate.

13. The method of preparing 2-thioureido 4,6-diamino 1,3-diazine which comprises effecting reaction between 2,4,6-triamino 1,3-diazine and an alkali-metal isothiocyanate.

14. The method of preparing 2-ureido 4,6-diamino 1,3-diazine which comprises effecting reaction between 2,4,6-triamino 1,3-diazine monohydrochloride and potassium cyanate.

GAETANO F. D'ALELIO.
JAMES W. UNDERWOOD.